United States Patent [19]

Olson

[11] 3,982,678

[45] Sept. 28, 1976

[54] NAIL DRIVING APPARATUS

[76] Inventor: Jerome A. Olson, 135 Gray Ave., Waukee, Iowa 50263

[22] Filed: Feb. 14, 1975

[21] Appl. No.: 549,905

[52] U.S. Cl. .................................. 227/63; 227/131; 227/136

[51] Int. Cl.[2] ...................... B25C 11/00; B25C 1/06

[58] Field of Search ................... 227/131, 9, 10, 11, 227/63, 136, 137

[56] References Cited

UNITED STATES PATENTS

| | | | |
|---|---|---|---|
| 1,574,490 | 2/1926 | Kumler et al. | 227/131 X |
| 2,094,459 | 9/1937 | Lipson | 227/63 |
| 2,525,637 | 10/1950 | Bell | 227/137 |
| 2,576,473 | 11/1951 | Meyers | 227/11 |
| 3,589,588 | 6/1971 | Vasku | 227/131 X |
| 3,847,322 | 11/1974 | Smith | 227/131 |

*Primary Examiner*—Granville Y. Custer, Jr.
*Attorney, Agent, or Firm*—Henderson, Strom & Sturm

[57] ABSTRACT

An apparatus for driving nails having an electrical power unit removably connected to a nail holding cartridge is disclosed. The power unit has an electric motor which drives a geared cylinder or drum. Gears on the drum intermesh with an elongated driven member having a nail engaging portion on one end thereof and being controlled in its longitudinal movement ultimately by the movment of the motor and directly by the geared drum. A barrel attached to the nail cartridge is adapted to receive nails, one at a time, from an automatic nail feeding mechanism also located in the nail cartridge. A nail holding mechanism disposed within the barrel insures that the nail is held straight throughout the nail driving operation. A nail countersinking attachment is provided for countersinking nails a predetermined distance into a nail driving material. Also, an extension attachment is provided to allow nails to be driven less than completely into a nail driving material by a predetermined amount. Additionally, a nail pulling attachment is adapted to be received on the apparatus of the invention.

23 Claims, 23 Drawing Figures

NAIL DRIVING APPARATUS

BACKGROUND OF THE INVENTION

The present invention relates generally to a semi-automatic nail drivingg apparatus and in particular to an electrically driven nail driving apparatus.

Automated nail driving devices are well known and are generally classifiable as being driven either by compressed air or by a coil spring which is charged after each successive nail is driven. These above mentioned types of nail driving devices have one particular thing in common: these devices cause the nail to be emitted from the nail device or gun as a projectile. The nail accordingly leaves the nail gun or device in much the same way that a bullet leaves a regular gun or rifle.

While this can be desirable in certain situations, one disadvantage is that the nail leaving the nail gun as a projectile can not be controlled during its flight. Accordingly, if the nail is being driven into a soft material it may very well penetrate in too far. In contrast, if the material is too hard, the nail will protrude, that is, it will not be inserted into the material by the desired distance. Even if the impact force of the nail which is emitted as a projectile from these devices were to be adjustable, there is still a problem of adjustment, since hard and soft materials can be encountered during the same job. For example when paneling is being connected to pine studs, the device could be set for use with a soft material; but if the nail were to hit a knot in a pine stud, the hardness of the knot would cause the nail to protrude in an undesirable fashion. The problem then, is that the nail can not be controlled with these types of devices as it is being driven.

Another problem with a projectile type of nail driving device is that there is nothing but the rigidity of the nails to prevent the nails from bending. Also, it is not practical in projectile type nailing devices to be able to countersink nails by a predetermined amount, or to be able to allow a nail to protrude by a predetermined amount. Furthermore, these devices are useful only to drive nails, and can not be used to pull nails.

The biggest disadvantage of using the compressed air projectile type of nail driving devices is the low availability of compressed air and the expense and inconvenience of obtaining it. It would obviously be more desirable to be able to use only electricity without the need for a compressor in order to be able to make a smaller nail driving unit which is more versatile and more portable.

In the prior art, nails for nail driving devices are often altered by cutting off part of the nail head in order to keep the nails aligned. A problem with this approach is that the nail loses some of its holding power with these portions of the nail head removed. Accordingly, a different solution to the nail alignment problem would be preferable.

SUMMARY OF THE INVENTION

The present invention relates to a device for driving nails. A barrel is attached to a main housing and an elongated driven member is disposed within the housing and positioned for movement along a longitudinal axis. The elongated driven member is moved along the longitudinal axis by a driving mechanism which is interlocked to the driven member by a gear structure. An electric motor or other prime mover is connected to the driving means for selectively driving it in one direction or in an opposite direction to thereby control the movement of the driven member into or out from the barrel. A nail holding mechanism is attached to the barrel for holding a nail in a position to be engaged by the nail engaging portion of the driven member and is associated with an automatic nail feeding mechanism for providing the nail holding mechanism with a nail after each successive nail is driven.

An object of the present invention is to provide a novel mechanism for driving a nail.

Another object of the present invention is to provide a nail driving mechanism capable of controlling the movement of the nail as it is emitted from the device.

A further object of the invention is to provide a nail driving apparatus having a depth control feature for allowing a nail to protrude from a surface by a predetermined amount.

Still another object of the invention is to provide a device which will countersink nails by a predetermined distance.

A further object of the present invention is to provide a nail handling apparatus which will pull nails.

A still further object of the present invention is to provide a device for automatically feeding and holding standard nails and to eliminate the need to align nails in a specific way.

Other objects, advantages, and novel features of the present invention will become apparent from the following detailed description of the invention when considered in conjunction with the accompanying drawings.

DESCRIPTION OF THE PREFERRED EMBODIMENTS

Figure 1:
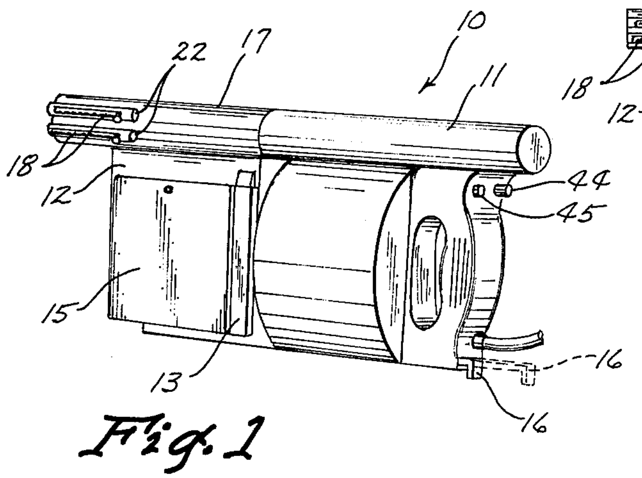
FIG. 1 shows a perspective view of the exterior of the electric hammer of the present invention.

Referring now to the drawings wherein like reference numerals designate identical or corresponding parts throughout the several views, FIG. 1 shows a nail driving apparatus 10 of the present invention. The nail driving apparatus 10 is easily separated into two parts, a power unit 11 and a nail cartridge 12. The power unit 11 has a locking groove 13 which slideably receives a locking projection 14 on the nail cartridge 12. Once the locking projection 14 is slideably received within the locking groove 13 a locking shaft 16 (FIG. 2) is moved from a position as shown in FIG. 2 to a left-most position, as shown in solid lines in FIG. 1, in order to lock the nail cartridge 12 securely to the power unit 11.

Figure 2:
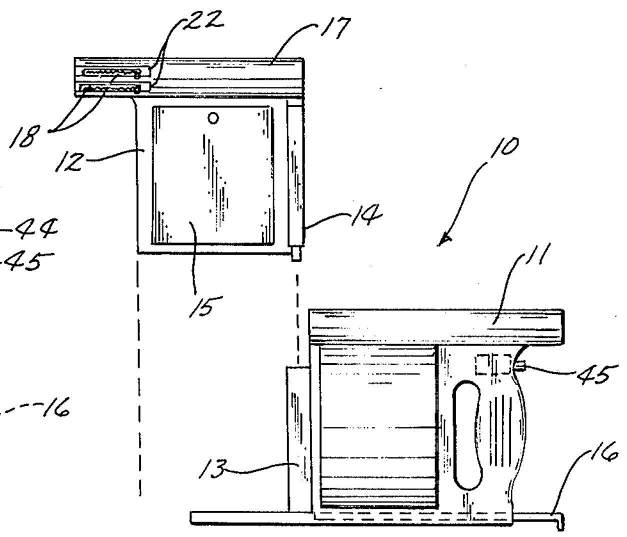
FIG. 2 is a side view of the present invention showing the nail cartridge separated from the power unit.
Figure 3:
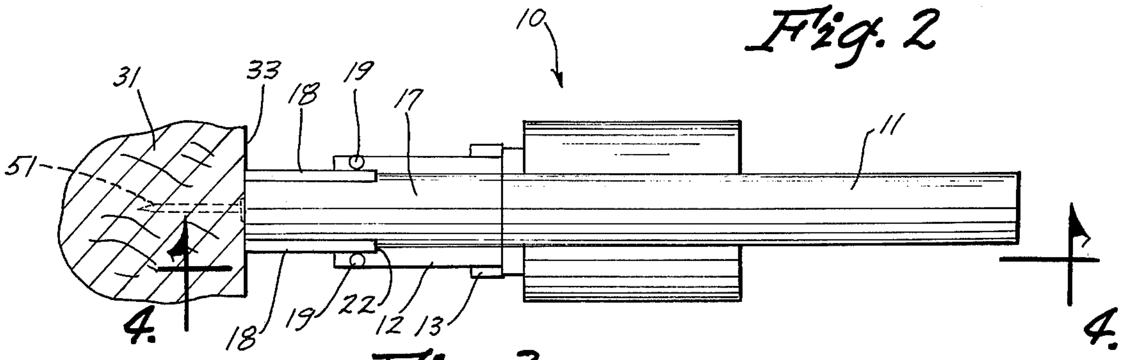
FIG. 3 is a top view of the present invention.

As shown in FIGS. 1 and 2, the nail cartridge 12 has a barrel 17 secured to the top thereof. The nail cartridge 12 also has an access door 15 on one side thereof, for providing access to the mechanisms within the nail cartridge 12, which mechanisms will be fully disclosed below. Additionally, the barrel 17 has four extension mechanisms 18 secured thereto, only two of which are illustrated in FIGS. 1–3, 18 and 19. These extension mechanisms 18 have handles 19 thereon, and a series of slots 21 along the length of a tube 22. The handle 19 is secured to an extension mechanism rod 23. These extension mechanisms 18 generally resemble a common bolt-type lock for a door, with the exception that they have several set positions corresponding to the slots 21, rather than the one single slot and position that would be found on a conventional door bolt lock. The actual operation of and use of the extension mechanisms 18 will be described below.

Figure 4:
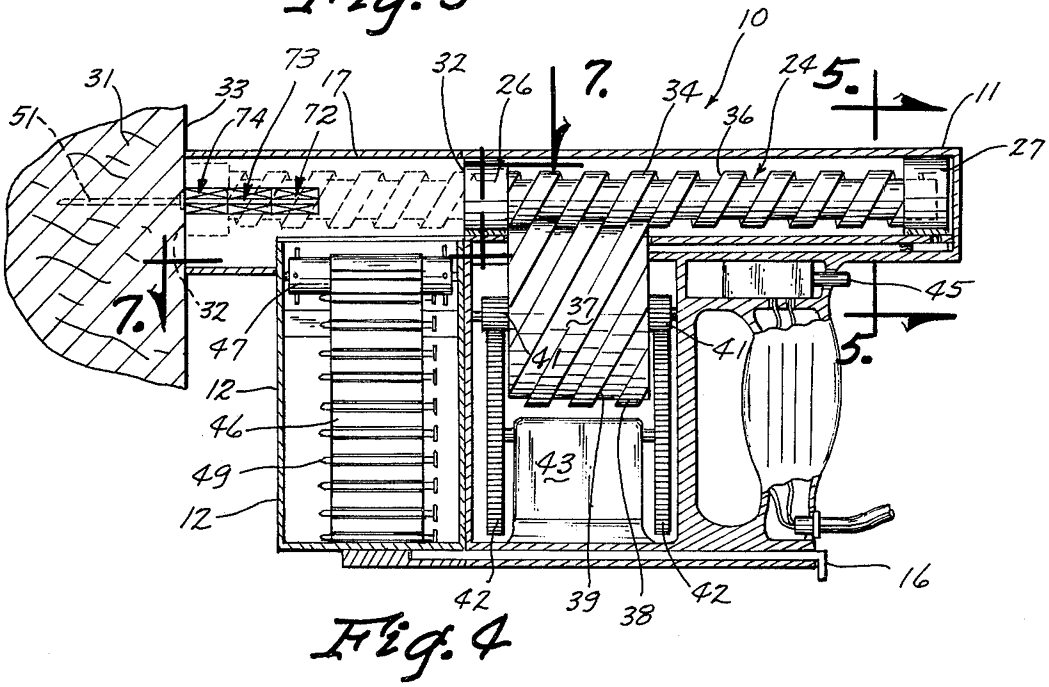
FIG. 4 is a cross-sectional view taken along line 4—4 of FIG. 3.
Figure 5:
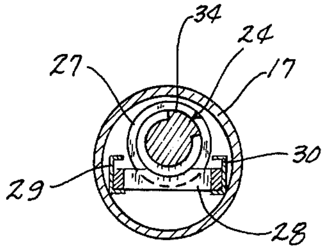
FIG. 5 is a cross-sectional view taken along line 5—5 of FIG. 4.
Figure 6:
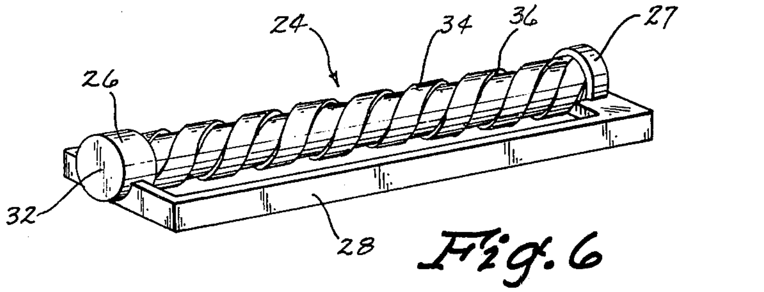
FIG. 6 is a perspective view of a gear driven member of the present invention.

Referring now to FIG. 4, an elongated driven member 24 is mounted at the extreme ends thereof within bearing members 26 and 27. These bearing members 26 and 27, and thereby the driven member 24, are supported on a longitudinal frame 28 (FIG. 6). The longitudinal support frame 28, in turn, is slideably received within a pair of channels 29 and 30 (FIG. 5) within and attached to the barrel 17 and within a pair of channels 29′ and 30′ within and attached to a top cylindrical portion of the power unit 11. Accordingly, the driven member 24 is longitudinally movable from a right-most position as shown in FIG. 4 in solid lines, to a left-most position in which the elongated driven member 24 extends to the end of the barrel 17 on the left, and for example flush with the surface 33 of material 31 as shown in FIG. 4 when the end of the barrel is against it. A nail engaging portion 32 (FIGS. 4 and 6) on the extreme front of the elongated driven member 24, adjacent the bearing member 26, is adapted to move from the position shown in FIG. 4 to a position flush with the nail driving surface 33 on material 31.

The elongated driven member 24 has a helical rib 34 extending along the length thereof forming a helical groove 36 also extending along the length thereof and mating therewith is a driving cylinder or drum 37 (FIG. 4). This driving cylinder 37 has a helical rib 38 and a helical groove 39 along the length thereof and these helical ribs and grooves 38 and 39 of the driving cylinder 37 are adapted to intermesh with the helical ribs and grooves 34 and 36 on the elongated driven member 24 in an interlocking fashion, such that the driving cylinder 37 can not move without causing movement of the elongated driven member 24.

The driving cylinder 37 has a driving gear 41 disposed on each side thereof (FIG. 4). These driving gears 41 mesh with motor gears 42 on each side of an electric motor 43. The speed of and the direction control for the electric motor 43 is shown generally by the forward and rearward switch buttons 44 and 45, respectively, in FIGS. 1 and 4, for example. It can be readily seen from FIG. 4 that the electric motor 43 drives the motor gears 42, which, in turn, turns the driving gears 41 in a specified direction, depending upon whether the forward or rearward switch button 44 or 45 is employed. Accordingly, the driving cylinder 37, which is interlocked with the elongated driven member 24, will control the movement of the elongate driven member 24 and will then also control the position of the nail engaging portion 32 on the end of the elongated driven member 24. Movement of the driven member 24 from the rightmost position as shown in FIG. 4 in solid lines to the leftmost position as shown in dashed lines is the nail driving stroke; and, movement from the leftmost position (dashed lines in FIG. 4) to the rightmost position (solid lines in FIG. 4) is the return stroke.

Figure 8:
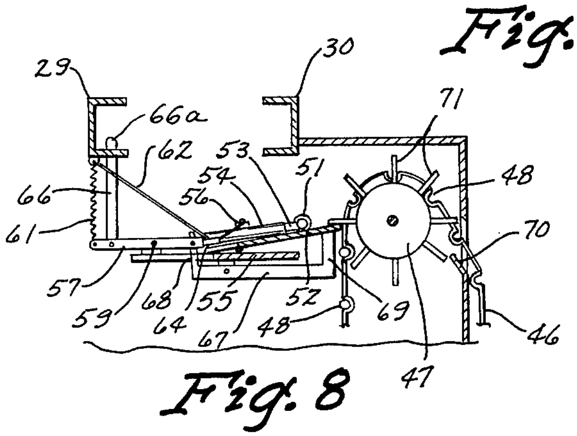
FIG. 8 is a partial cross-sectional view taken along line 8—8 of FIG. 7.
Figure 9:
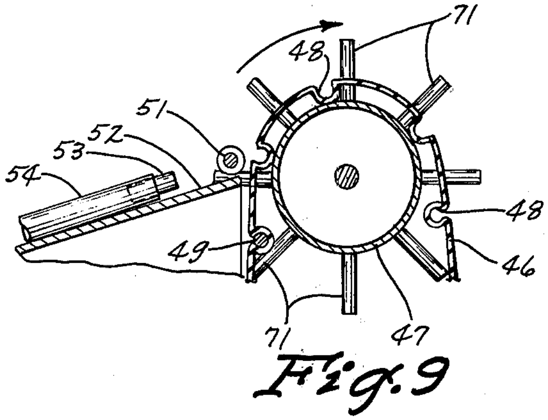
FIG. 9 is a partial enlarged view of FIG. 8.

FIG. 9 shows a resilient belt 46 which is disposed around a shaft 47. Shaft 47 is rotatably mounted to the nail cartridge 12 as is clearly shown in FIG. 4. A series of equidistantly spaced loops 48 are disposed along the length of the belt 46 and each of these loops 48 is adapted to hold a nail. A nail 49 is shown disposed in one of the loops 48, which loop is approaching the shaft 47 in FIG. 9. Once the loop 48 reaches the shaft 47 and begins its ascent over the top of the shaft 47, the loop 48 will open up and release the nail. The nail, which released nail is numbered 51 to avoid confusion with confined nail 49, is shown being deposited, by this operation, onto the nail receiving surface 52 attached to support member 55, which is, in turn, rigidly attached to the interior of the nail cartridge 12. This nail receiving surface 52 is slanted, and gravity causes the nail 51 to roll down and abut a pair of magnets 53 which are connected on the end of platform arms 54. This relationship is clearly shown in FIGS. 7, 8 and 9. It is noted that a pair of platform arms 54 are preferred, although one would be operable, and are mounted along pivotal points 50 at the bottom thereof as clearly shown in FIG. 7. These platform arms 54 are connected together by a rigid bar or rod 56 which locks the movement of the platform arms 54 together.

Figure 7:
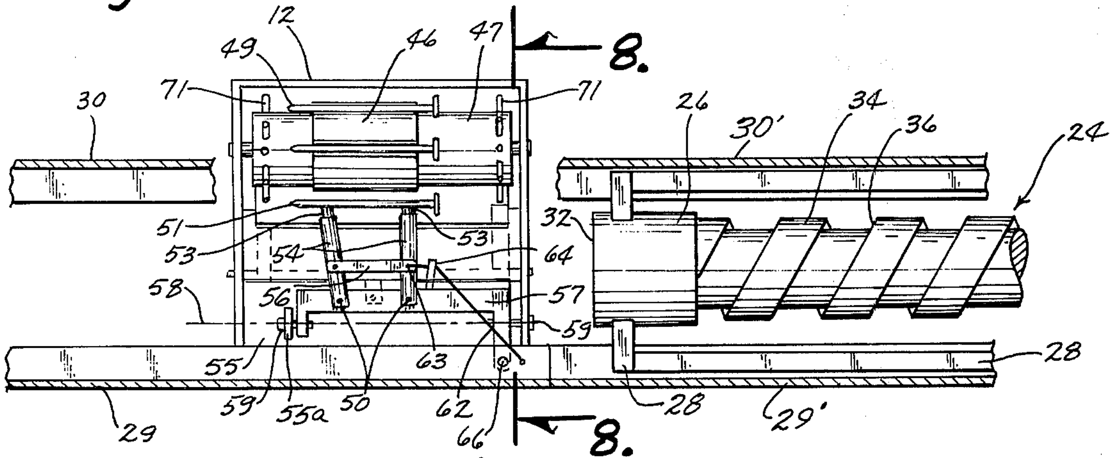
FIG. 7 is a partial cross-sectional view taken along line 7—7 of FIG. 4.

A platform 57 is pivotally connected along a pivotal 58 (FIG. 7) and this axis corresponds to pivots 59 as shown in FIGS. 7 and 8. The pivots 59 are fixed with respect to the nail cartridge housing 12, one of the pivots 59 being connected directly to the nail cartridge 12 (FIG. 7), and the other pivot 59 being connected to a tab 55a rigidly attached to support member 55. A tension spring 61 is connected at one end thereof to the platform 57 and a the other end thereof to one of the channels 29. A cable 62 also is connected to the channel 29 at one end thereof and at the other end thereof to one of the platform arms 54 at the point 63 (FIG. 7). The cable 62 also passes freely through a cable guide apertured member 64 which is rigidly affixed to the platform 57. Also pivotally connected to the platform 57 is a nail feed control arm 66 (FIG. 8). The upper end of the nail feed control arm is biased upwardly into the channel 29 by the force of the spring 61.

Figure 10:
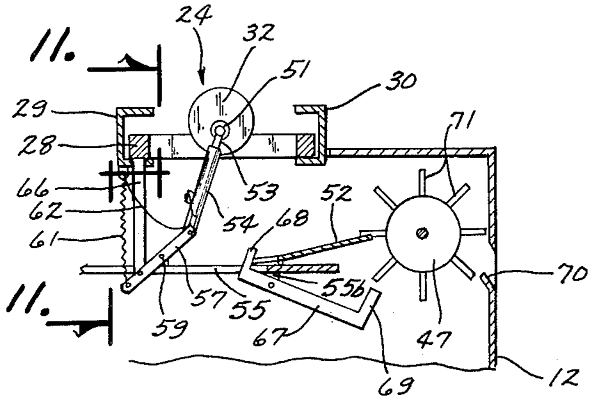
FIG. 10 is a cross-sectional view, like FIG. 8, but showing the mechanism in a different position.
Figure 11:
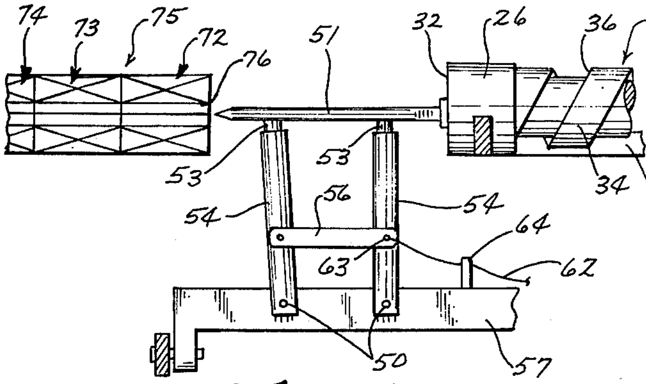
FIG. 11 is a partial cross-sectional view taken along line 11—11 of FIG. 10.
Figure 12:
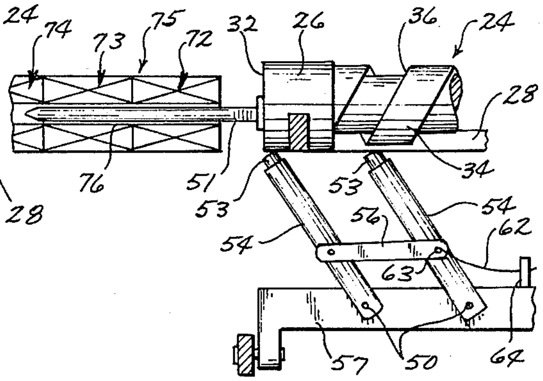
FIG. 12 is a partial view, like FIG. 11, but showing the mechanism in a different position.

The operation of the nail feeding apparatus will now be described. Assume that initially we were beginning with the apparatus generally as shown in FIG. 10, wherein the platform 57 and the platform arms 54 are in a raised position, and wherein the driven member 24 is in the approximate position as shown in FIG. 11. Once the driven member is moved into the barrel as shown by the movement of the driven member 24 from FIG. 11 to FIG. 12, the nail 51 is driven to the left because of its engagement with the nail engaging portion 32 of the driven member 24. Also at this time, the movement of the driven member 24 causes the platform arms 54 to be moved and pivoted to the left about pivotal points 50 (FIGS. 11 and 12). In FIGS. 7, 11 and 12 it can be seen that the platform arms 54 are pivotally attached to the platform 57 by pivots 50. The platform arms 54 are allowed to pivot to the left because of the looseness of the cable 62 when the platform 57 is moved to the FIG. 10 position. It is noted that in FIG. 10 the longitudinal support frame 28 of the elongated driven member 24 is holding down the nail feed control lever 66, which causes a pivoting of the platform 57 to hold the platform 57 and the platform arms 54 in the upward position.

Figure 23:
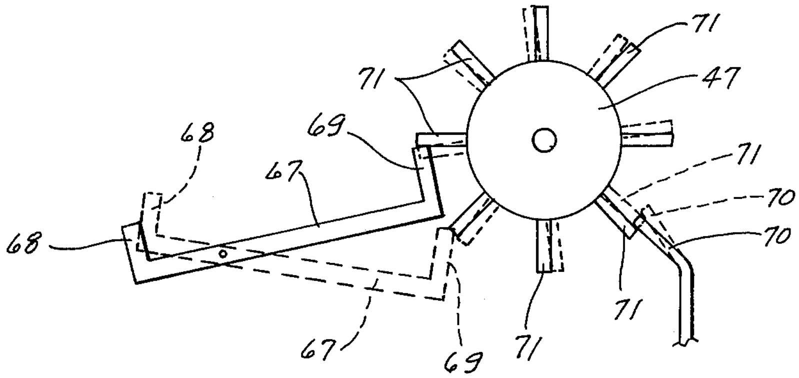
FIG. 23 is a view like FIG. 8 but simplified to show sequentially the movement of a portion of the nail feeding mechanism.

Once the driven member 24, and with it the longitudinal support frame 28, moves along the channel 29 out of the way of lever 66 so that the nail feed control lever 66 can move upwardly in response to the pull of the tension spring 61, the nail feeding mechanism will move to the position shown in FIG. 8. During this movement of the mechanism from the position shown in FIG. 10 to the position shown in FIG. 8, attention is directed to the movement of the pivoted lever 67 having a pair of upstanding portions 68 and 69. The lever 67 is pivotally attached to a tab 55b, which is, in turn, rigidly attached to support bracket 55. Once the platform 57 comes down and abuts the extension portion 68, the lever 67 will pivot from the position shown in FIG. 10 to the position as shown in FIG. 8. Along with this movement, the extending portion 69 of the lever 67 will abut one of the projections 71 which are equidistantly spaced around the periphery of the shaft 47. Accordingly, the shaft 47 will be advanced by a distance equal to the distance between adjacent loops 48 in the belt 46 so that a nail will be dropped as shown in FIG. 9 every time that the shaft 47 advances. A resilient projection 70 (FIG. 10) allows the shaft 47 to advance past it due to movement of the lever 67, but prevents the shaft from advancing or retracting (FIG. 23) at other times by abutting projections. The resilient projection 70 is stiff enough to prevent the adjacent projections 71 from passing over it due to movement of the shaft 47 which is caused by vibrations or exterior forces, such as the dropping of the device 10; but, the resilient projection is flexible enough to allow a projection 71 to pass by projection 70 due to the greater force caused by the lever 67, which forces the shaft to move in a clockwise direction when the lever 67 moves from the position shown in FIG. 10 to the position shown in FIG. 8. This movement of shaft 47 is due to the abutment of extending portion 69 with one of the projections 71.

Additionally, it is noted that when the platform 57 is pivoted from the position in FIG. 10 to the position shown in FIG. 8, the cable 62 becomes tight and pulls the platform arms 54 back into a perpendicular position with respect to the platform 57. This relationship between the platform arms 54 and the platform 57 is shown in FIG. 11, but FIG. 11 shows also the platform arms pivoted upwardly, in addition.

Referring again to FIG. 8, the magnets 53 are shown holding the nail 51 resting upon the nail receiving surface 52. The driven member 24 is then moved into the barrel and along the channel 29 to the left until it depresses the nail feed control lever 66, at which time the entire nail feeding mechanism is moved to the position shown in FIG. 10, and whereby the nail 51 is moved up into the barrel 17 and adjacent the nail driving surface 32 as clearly shown also in FIG. 11. It is noted that the top **66*a* of control lever 66 is rounded and extends only slightly into the channel 29 in the FIG. 8 position. The top 66*a* extends into the channel 29 far enough to get the length of movement required, but not so far as to prevent the support frame from moving over and past it to thereby depress lever 66. This cyclic operation is repeated again and again each time the nail driving device of the present invention is used and a nail is automatically placed in the position shown in FIGS. 10 and 11** for each cycle in which this is done.

Figure 13:
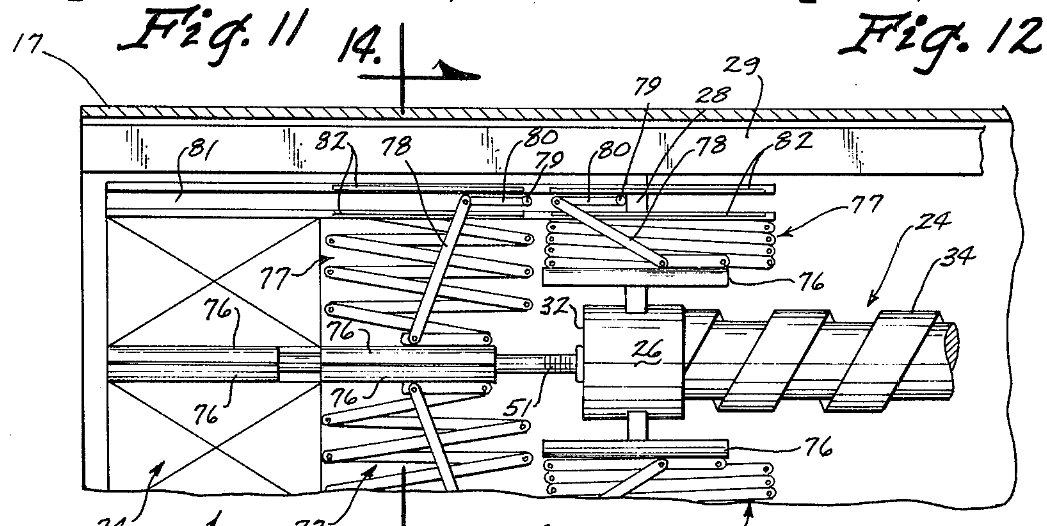
FIG. 13 is a top view of the mechanism shown in FIG. 12.
Figure 14:
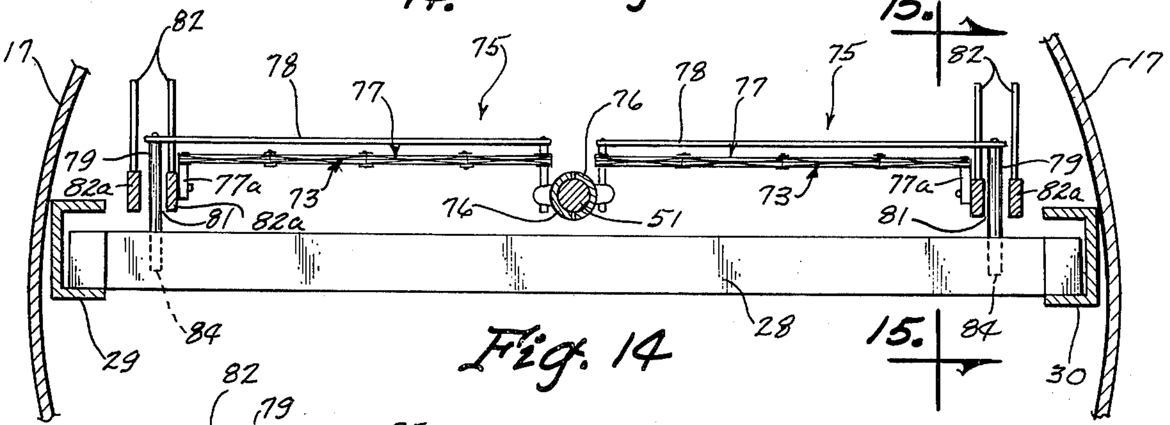
FIG. 14 is a partial cross-sectional view taken along line 14—14 of FIG. 13.
Figure 15:
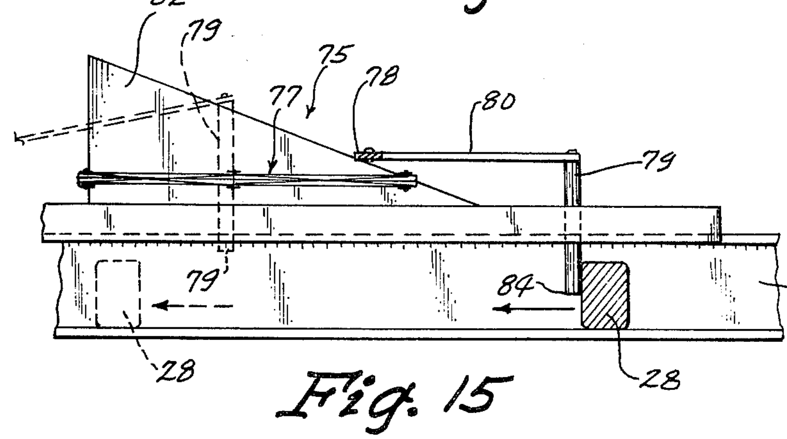
FIG. 15 is a partial cross-sectional view taken along line 15—15 of FIG. 14.

Referring now to the nail holding mechanism 75 of FIGS. 11-15, it is noted that for each cycle of operation that a nail is moved up into the position as shown in FIG. 11. This nail 51 is then moved to the left by the driven member 24, as shown in FIG. 12, and into the nail holding mechanism 75 which has a first, second and third section 72, 73 and 74, respectively. The nail holding mechanism sections 72–74 are identical and are symetrical. Each nail holding section 72–74 has a member 76 which has a groove longitudinally disposed therein, for reception of the nail 51. These grooved members 76 are movably supported by an accordion-like linkage 77. The accordion-like linkage 77 is connected at one end **77*a* to cam support rods 82*a*, which are, in turn, rigidly affixed to the channels 29 and 30 which are rigidly affixed to the barrel 17. This accordion-like linkage 77 is connected to a bar 78. A linkage member 80 is pivotally connected at its ends to bar 78 and flexible feeler rod 79. The flexible feeler rod 79 is slideably received in a slot 81 formed between cam members 82, which are rigidly mounted to the channels 29 and 30 and also formed in a camming surface 82. Referring to FIG. 15, for example, and assuming that the driven member 24 is moving from right to left towards the end of the barrel 17, the driven member support frame 28 will abut the flexible member 79, of first section 72, and cause it to move to the left. As the flexible member 79 is pushed to the left as shown in FIG. 15 the member 78 will ride up on the camming surface 82 to the point wherein it is shown in dashed lines in FIG. 15. Also during this movement of flexible member 79 from the position shown in solid lines in FIG. 15 to the position shown in dashed lines, the angle and orientation of member 78 will change to thereby retract the accordion-like members 77 (FIG. 13**). As the members 78 and 79 move from the position shown in solid lines in FIG. 15 to the position shown in dashed lines in FIG. 15, the accordion-like member 77 and the grooved members 76 of the first section of the nail holding mechanism 72 will move out of the way of the driven member 24 as shown in FIG. 13 and release a portion of nail 51. Additionally, as the driven member 24 continues to the left as shown in FIG. 13, each successive one of the sections 73 and 74 respectively of the nail holding mechanisms 75 will move out of the way of the driven member 24 in the same way that the section 72 of the nail holding mechanism 71 is shown out of the way of the driven member 24 in FIG. 13. Meanwhile, during the nail driving operation, each section 72–74 of the nail holding mechanism 75 holds the nail 51 solidly for as long as possible in order to keep the nail 51 straight while it is being driven.

Inherent vibration of device 10 will cause the member 78 and thereby the flexible member 79 to move down the ramp of cam surface 82 by a slight amount so that once the driven member 24 begins to retract, the driven member support frame 28, as shown in FIG. 15, will catch the end 84 of the flexible feeler rod 79 and will pull it backwardly to the right as shown in FIG. 15, and ultimately back into the position of sections 73 and 74 of the nail holding mechanism 71 as shown in FIG. 13. As the support frame 28 continues to move to the right, the flexible feeler rod 79 will then bend or flex just enough to allow the driven member support frame 28 to pass back to the right side of the flexible member 79 to the position as shown in solid lines in FIG. 15. It is to be understood that each one of the sections 72–74 of the nail holding mechanism 75 are identical; each section 72–74 having the structure as shown in FIG. 15 on each side thereof.

Figure 16:
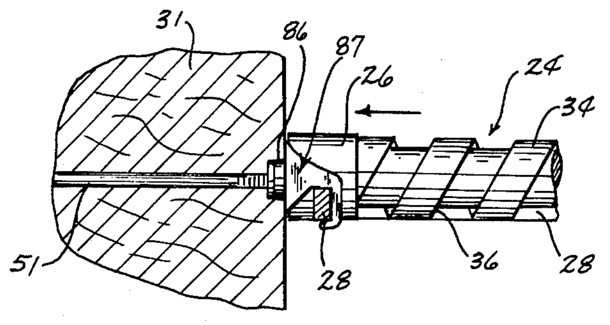
FIG. 16 is a partial view of a countersinking attachment to the present invention.
Figure 17:
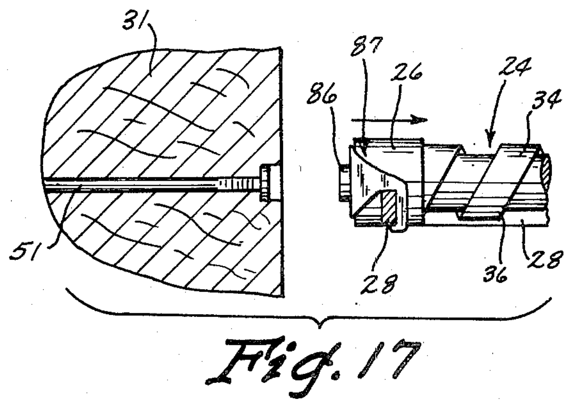
FIG. 17 is a view of a nail having been inserted and countersunk with the countersinking apparatus shown in FIG. 16.

When it is desired to countersink a nail, the countersinking attachment as shown in FIG. 16 is attached by clipping it around the driven member support frame 28 when the driven member 24 is positioned at its extended position; that is, when the surface 32 is flush with the front of the barrel 17. Then when the nail 51 is driven, the projection 86, which is attached to the countersinking attachment 87, will countersink the nail as shown in FIG. 17. The nail driving apparatus is operated in the same manner as described above, whether or not the countersinking attachment 87 is attached.

Figure 18:
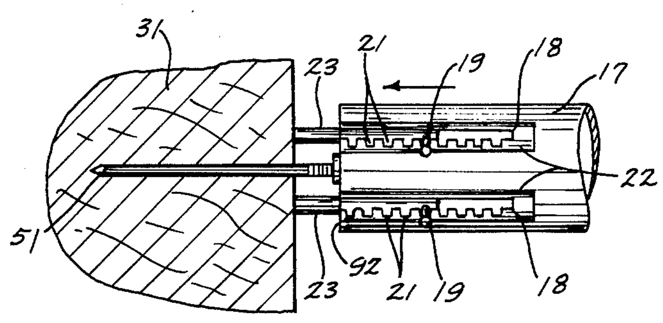
FIG. 18 is a view of an extension mechanism in operation for inserting a nail a predetermined distance less than completely inserted.
Figure 19:
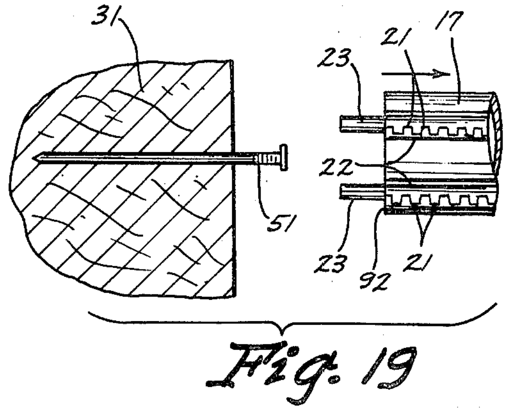
FIG. 19 shows the nail of FIG. 18 inserted only partially by a predetermined distance.

In order to utilize the extension mechanisms 18 as described above, they are extended by an extension mechanism rod 23 equidistantly by a desired amount as shown in FIG. 18 by locking the handle 19 within an appropriate slot 21 in tube 22. Consequently, when the driven member 24 drives the nail to the end of the barrel 17, and the extension mechanisms 18 are in abuttment with the nail driving surface 32, then the nail 51 will be driven only by the amount desired, and will protrude by only a specified amount for example as shown in FIG. 19.

Figure 20:
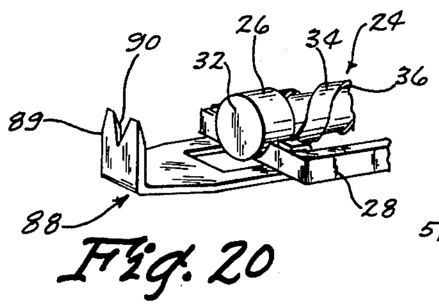
FIG. 20 is a partial perspective view of a nail pulling attachment of the present invention.
Figure 21:
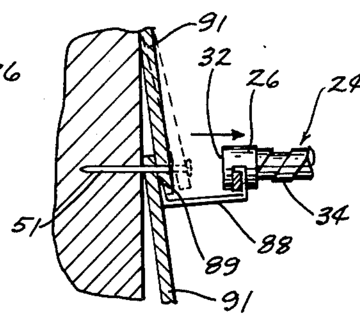
FIG. 21 shows the nail puller of FIG. 20 in a position to pull a nail.
Figure 22:
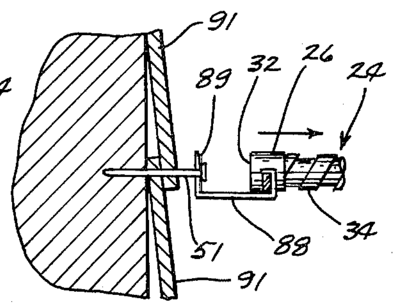
FIG. 22 shows the nail puller attachment in operation.

A nail pulling attachment 88 is shown in FIGS. 20–22. It also clips around the driven member support frame 28. This attaching operation is preferably done when the driving surface 32 of the driven member 24 is flush with the front end of the barrel 17. An upstanding portion 89 of the nail pulling attachment 88 has a V-shaped groove 90 in one end thereof. This groove 90 resembles conventional nail pulling structure. In FIG. 21 the nail pulling attachment can be seen wedged between two pieces of siding 91. Accordingly, when the driven member 24 is retracted within the barrel 17 away from the end of the barrel 92 (FIG. 18), thereby causing the nail pulling attachment 88 to also be pulled in that direction and the pieces of siding are separated. The nail 51 can then be easily pulled out either partially or completely as desired. It should be noted that FIG. 21 shows the nail driving attachment in readiness to separate the siding 91 along with the nail, and that in FIG. 22 the attachment is used merely to pull the nail 51 completely out of both pieces of siding 91 and out from a supporting surface 92. The forward and rearward movement of the driven member 24 is easily controlled by the buttons 44 and 45 as discussed above. Accordingly, the movement of the attachment 88 with respect to the barrel 17 is also easily controlled in this manner.

Obviously many modifications and variations of the present invention are possible in light of the above teachings. It is therefore to be understood, that within the scope of the appended claims, the invention may be practiced otherwise than as specifically described.

I claim:

1. A device for driving nails comprising:
a housing;
a barrel attached to said housing;
an elongated driven member attached to said housing and positioned for movement along a longitudinal axis thereof at least partially within said barrel and having a nail engaging portion;
a driving means for selectively moving said driven member in a direction along the longitudinal axis thereof, said driven member having a driving stroke in one direction for driving a nail and a return stroke in an opposite direction along said longitudinal axis;
gear means for mechanically interlocking said driven member to said driving means during said driving stroke;
nail holding means attached to said barrel for holding said nail in position to be engaged by the nail engaging portion of said elongated driven member; and
means for controlling the movement of the driving means and thereby controlling the movement of said driven member.

2. A device for driving nails as defined in claim 1 wherein said driving means controls the speed and direction of said driven member.

3. A device for driving nails as defined in claim 2 wherein said driving means includes an electric motor.

4. A device for driving nails as defined in claim 3 wherein said electric motor is a reversible type.

5. A device for driving nails as defined in claim 1 and having at least one slot means attached to said housing; and
wherein a bearing means is rotatably attached to each end of said driven member and having at least one protuberance thereon slideably received in said at least one slot means.

6. A device for driving nails as defined in claim 1 wherein at least one extension means is attached to said barrel for spacing an end of the barrel a predetermined distance from a nail driving surface.

7. A device for driving nails as defined in claim 6 wherein four extension means are attached to said barrel and having means for adjustably positioning said extension means with respect to said barrel.

8. A device for driving nails as defined in claim 1 including a nail cartridge portion slideably connected to said housing and having the barrel and the nail holding means attached thereto.

9. A device for driving nails as defined in claim 8 wherein a belt means having a plurality of nails attached thereto is disposed in said nail cartridge portion for supplying nails to said nail holding means.

10. A device fro driving nails as defined in claim 1 including a nail countersinking means removeably attached to the nail engaging portion of said driven member for causing a nail to be driven beyond the surface of the material into which the nail is being driven.

11. A device as defined in claim 1 including a nail pulling means removeably attached to the nail engaging portion of the driven member for pulling nails inserted in a material.

12. A device as defined in claim 11 having a base member, an upstanding slotted member connected to said base member and being oriented substantially normally with respect to the base

13. A device for driving nails as defined in claim 1 wherein said nail holding means comprises:

a first member inside of a first section of said barrel and having a groove in one side thereof;

a second member inside of said first section of said barrel and having a groove in one side thereof;

means for maintaining said first and second members together whereby the grooved sides thereof are adjacent with respect to each other; and means for moving and maintaining said first and second members apart from each other when said driven member is in said first section of said barrel.

14. A device for driving nails as defined in claim 13 including a third member inside of a second section of said barrel and having a groove in one side thereof;

a fourth member inside of side second section of said barrel and having a groove in one side thereof;

means for maintaining said third and fourth members together whereby the grooved sides thereof are adjacent with respect to each other; and means for moving and maintaining said first and second members apart from each other when said driven member is in said second section of said barrel.

15. A device for driving nails as defined in claim 1 including an automatic nail feeding means, said automatic nail feeding means comprising:

a nail receiving surface, means for periodically placing a nail on said nail receiving surface;

a platform being pivotally connected to said housing along a first axis;

at least one platform arm being pivotally mounted at one end thereof to said platform, said second axis being substantially transverse to said first axis, the other end of said platform arm resting on said nail receiving surface in one position thereof and extending into said barrel in another position of said platform arm;

magnetic means for attracting and holding a nail being attached to the other end of said platform arm;

means for biasing said platform arm to said one position to rest on said nail receiving surface when said driven member is substantially withdrawn from the barrel; and means for moving said platform arm to said other position whereby said other end of the platform arm extends into the barrel when said driven member is in said barrel.

16. A device for driving nails as defined in claim 15 including means for pivotally moving said platform arm in one direction about said second axis thereof in response to movement of said driven member into said barrel whereby the platform arm is moved out of the way of said driven member.

17. A device for driving nails as defined in claim 16 including means for pivotally moving said platform arm in a direction opposite to said one direction about said second axis thereof in response to movement of said driven member out of said barrel.

18. A device for driving nails as defined in claim 17 wherein said means for pivotally moving the platform arms in the opposite direction include a flexible member connected to said platform arm at one end thereof and to a point fixed with respect to said housing at the other end thereof.

19. A device for driving nails as defined in claim 17 wherein a second platform arm is pivotally connected to said platform and a rod is pivotally connected at one end to said first platform arm and pivotally connected at the other end thereof to said second platform whereby said first and second arms are locked together for movement.

20. A device for driving nails as defined in claim 15 wherein said means for periodically placing a nail on said nail receiving surface includes a rotatable shaft adjacent said nail receiving surface;

a flexible belt disposed around one side of said shaft, nail receiving loops in said flexible shaft for holding nails whereby said nails are held in said loops until each respective belt loop begins to pass over said shaft, at which time the loop is automatically pulled open and releases a nail; and means for advancing said rod and thereby said belt by an amount equivalent to the distance between adjacent loops each time that the driven member is moved substantially out of the barrel.

21. A device for driving nails as defined in claim 20 wherein a plurality of evenly spaced projections extend outwardly from said rotatable shaft; and a lever pivotally mounted intermediate the ends thereof along an axis fixed with respect to the housing, one end of said lever being in abutment with said platform when said platform is in said one position, and said other end of said lever is in abutment with one of said projections in said one position of said platform to thereby advance said rotatable shaft and thereby said belt a distance equivalent to the distance between adjacent belt loops.

22. A device for driving nails as defined in claim 1 wherein said gear means comprises mating helical ridges and grooves on said driving means and said driven member.

23. A device for driving nails as defined in claim 1 wherein said gear means mechanically interlocks the driven member to the driving means during the return stroke.

* * * * *